Jan. 28, 1958
N. CAPELLARO
2,821,342
DIVIDEND DIVISOR ALIGNING MECHANISM FOR COMPUTING MACHINES
Filed Nov. 15, 1954
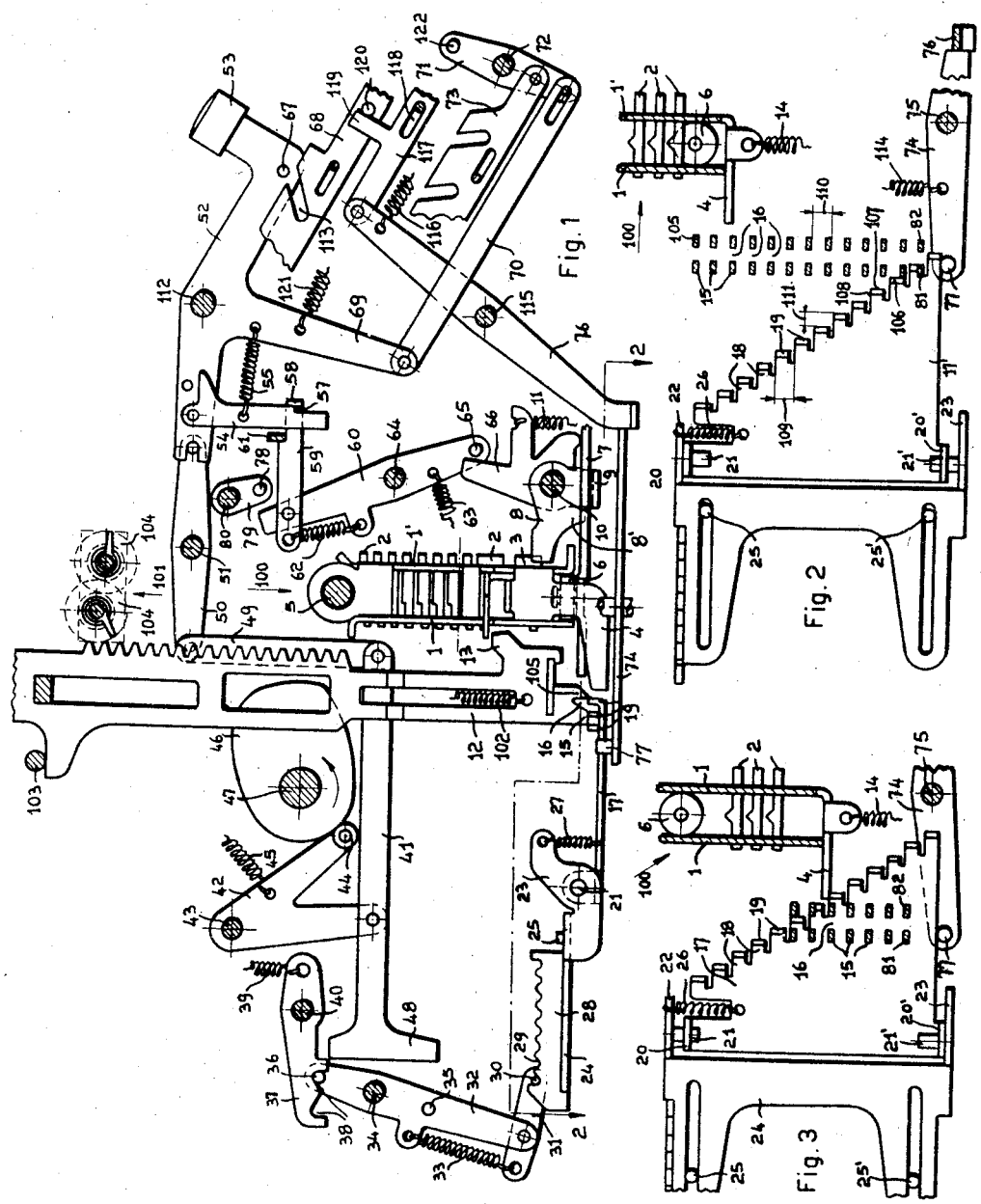

United States Patent Office 2,821,342
Patented Jan. 28, 1958

2,821,342

DIVIDEND-DIVISOR ALIGNING MECHANISM FOR COMPUTING MACHINES

Natale Capellaro, Ivrea, Italy, assignor to Ing. C. Olivetti & C., S. p. A., Ivrea, Italy, a corporation of Italy Application November 15, 1954, Serial No. 468,986

Claims priority, application Italy November 17, 1953

19 Claims. (Cl. 235—60)

The present invention relates to computing machines and the like, having a traveling amount representing device, such as an indexing mechanism, and is more specifically concerned with a mechanism for automatically aligning said traveling device with the amount represented by a stationary amount representing device, such as a register.

As used in the present specification and claims the term "computing machine" is intended to include any type of machine for accumulating items in which the mechanism of the present invention may be usefully employed, as, for example, in adding and/or subtracting machines, calculating machines, cash registers, accounting machines, and book-keeping machines.

A well known example of an operation requiring the alignment outlined above is the division. When setting up a division problem in an adding and subtracting machine provided with means for performing automatic division, the dividend is entered into the register and the divisor is entered into the traveling indexing mechanism. Before starting the machine for operation it is necessary for the operator to align the highest significant order of the divisor with the highest significant order of the dividend. Another example of an operation requiring previous alignment is when the amount stored in the register is to be reset into the indexing mechanism, which must be then aligned with the highest significant order of the amount to be reset.

Heretofore said alignment was normally done by visual inspection of the factors and repeated manipulation of keys. In setting up a division problem, for instance, the divisor was added a suitable number of ciphers or spaces in order to properly align it with the dividend.

The purpose of the present invention is to eliminate the visual inspection and manual aligning steps in operations requiring alignment and to cause the factors to be aligned automatically upon depression of a suitable key.

It is, therefore, an object of the invention to provide an automatic aligning mechanism for a computing machine which will cause the factors to be aligned in one continuous automatic operation.

Another object of the invention is to provide an aligning mechanism for such a machine which is of simple construction and reliable operation.

In accordance with the invention I provide in a computing machine comprising a traveling amount representing device and a stationary amount representing device having a plurality of denominational orders, means for sensing the highest significant order of the amount represented by said stationary device. I further provide means controlled by said sensing means for differentially arresting said traveling device in predetermined relation to said highest significant order.

In a preferred form of the invention, wherein the stationary device comprises a set of amount representing elements arranged in denominational orders and movable from a zero position to a position representing a significant digit, I provide a halting device movably mounted in relation to said set and operable for differentially halting the progress of the traveling device. This halting device includes a sensing element and an arresting element in each denominational order, said sensing elements sequentially sensing the positions of said representing elements from the highest to the lowest order, the sensing element of the highest significant order of the amount represented in said set acting in response to the position of the representing element of such order to cause one of said arresting elements to arrest said halting device. The latter furthermore includes a stop having a fixed relation to each of said sensing elements, the stop corresponding to said sensing element of the highest significant order halting said traveling device in predetermined relation to said order.

Further objects, features and advantages of the invention will become apparent from the following detailed description of a preferred embodiment thereof, taken in conjunction with the accompanying drawings in which like numerals refer to like parts in the several views and in which:

Fig. 1 is a partial left-hand longitudinal view through an adding and subtracting machine embodying the invention, showing one denominational order thereof;

Fig. 2 is a sectional view taken on line 2—2 of Fig. 1, showing the parts in normal position;

Fig. 3 is another sectional view taken on line 2—2 of Fig. 1, showing the parts in working position.

The adding and subtracting machine shown in the drawing is of the well-known type comprising a traveling amount representing device, such as a pin carriage 100 (Fig. 1), a set of longitudinally movable actuators 12 and a register 101. As shown in Figs. 1 and 2, the pin carriage 100 is made as usually of two plates 1 and 1' carrying nine horizontal denominational rows of indexable stop pins 2 and one horizontal row of spacing pins 3. The pin carriage 100 is slidable over a stationary transverse shaft 5 and is guided by a roller 6 supported by a base plate 7 (Fig. 1). A spring 14 (Fig. 2) urges the pin carriage 100 to slide on the shaft 5 toward the left hand side of the machine (downward in Fig. 2).

However, normally the pin carriage 100 rests with one of its spacing pins 3 on a spacing dog 8 projecting from a bail 9. This latter is pivotally mounted on a stationary shaft 10 and is urged clockwise by a spring 11 attached to an arm 66 of the bail. The spacing dog 8 engages with its lower appendix 8' a slot in the base plate 7. Therefore, the pin carriage is arrested, through the spacing dog 8, by the base plate 7.

When a digit is set up in the keyboard, not shown in the drawing, a corresponding stop pin 2 is moved backward (leftwards as seen in Fig. 1) to act as a stop upon a projection 13 of the actuator 12, which is urged upwardly by a spring 102. Normally the actuators are held in their lowest or fully returned position by a universal bar 103.

The main operating shaft of the machine is designated by the numeral 47. As is known in the art, this shaft makes a constant revolution at each machine cycle and by known means, not here described, imparts a forward and then a return stroke to one or more operating mechanisms, as the universal bar 103. More particularly, as here shown, the universal bar 103 moves first upwards and then downwards.

When the universal bar 103 is so raised, each actuator 12 is moved upwards by its spring 102 until arrested by the stop pin 2 set into the path of its projection 13.

The actuators 12 cooperate with the register 101. The particular register shown in Fig. 1 is an algebraic register of the known type comprising two sets of pinions 104 which are in constant mesh with each other and which are alternatively engageable with the actuators 12. Normally the register 101 is held out of engagement with the actuators, as shown in Fig. 1. Upon shifting the register 101 backwards, the rearward set of pinions engages with the actuators 12.

As is well known in the art, in an amount entering operation the register 101 is usually held out of engagement during the upward movement of the actuators 12, but is shifted into engagement therewith before the return or down stroke of the actuators, whereby during the latter the amount set up in the pin carriage 100 is entered into the register.

In a total taking operation the register is first shifted into engagement with the actuators whereby during the upward movement of the actuators the register pinions are reset to zero and the total is transferred to the actuators for thereupon controlling a printing mechanism, for instance. During the return or down stroke of the actuators the register may be either shifted out of engagement with the actuators if the register is to be cleared, or it may be held in engagement with the actuators if the total is to be reentered into the register, as is the case in a sub-total operation.

Each actuator 12 is formed with a lug 15, an aperture 16 and an apex 105 cooperating with a halting device movably mounted for halting the progress of the traveling pin carriage 100, which in the present embodiment is formed by a plate 17 (Figs. 1 and 3). The plate 17 is formed with a set of step-wise arranged extensions 18, each one terminating with a bent-over lug 19. Each lug 19 includes three different portions, each one having its own function, namely an upper sensing edge 106 (Fig. 2) adapted to contact the lug 15 of an actuator 12, as does the intermediate lug 19 shown in Fig. 1, a forward arresting face 107 adapted to be arrested by the apex 105 of an actuator 12, and a lateral stop edge 108 adapted to stop an extension 4 protruding from the pin carriage 100, as shown in Fig. 3. The distance 109 (Fig. 2) between the lateral stop edges of two adjacent extensions 18 is equal to the distance 110 between two adjacent actuators 12. The distance 111 between the forward arresting faces 107 of two adjacent lugs 19 is such that when a lug 19 contacts with its upper edge 106 a lug 15 (Fig. 1), the lug 19 of the next higher order (the right hand end lug 19 of Fig. 1) is located below the aperture 16 of the actuator 12 of the next higher order. The lower edge of the lug 15 has a longitudinal size which is equal to the distance 111, so that there is always a lug 19 contacting the lug 15 of one of the actuators 12.

The plate 17 is pivotally mounted by means of two bent-over lugs 20 and 20' on two pivots 21 and 21'. These are secured to the extensions 22 and 23 of a plate 24 (Figs. 1 and 3) mounted for longitudinal movement on two fixed studs 25 and 25'. As may be seen in Figs. 2 and 3, the plate 17 is transversely slidable on the pivots 21 and 21' through an amount corresponding to the distance between the extension 23 or 22 and the adjacent lugs 20' and 20, respectively. Normally a spring 26 tensioned between the extension 22 and the plate 17 holds the latter in the position shown in Fig. 2. A spring 27, tensioned between the extension 23 and the plate 17 (Fig. 1) urges the latter counterclockwise about the pivots 21 and 21'.

To the plate 24 is secured a rack 29 (Fig. 1) which cooperates with a stud 30 of a pawl 31 pivoted on a lever 32. A spring 33 tensioned between the pawl 31 and the lever 32 urges the stud 30 into engagement with the rack 28. The lever 32 is fulcrumed on a fixed pivot 34 and carries two studs 35 and 36 diametrically opposed with respect to said pivot. The stud 36 cooperates with either one of two notches 38 of a positioning lever 37 pivoted at 40 and urged counterclockwise by a spring 39.

On a fixed pivot 43 is fulcrumed a lever 42 carrying a roller 44 and urged counterclockwise by a spring 45.

The roller 44 cooperates with a cam 46 secured to the main shaft 47.

To the lever 42 is pivoted a bar 41 formed with a rearward appendix 48 adapted to cooperate with either of the studs 35 and 36. At its forward end the bar 41 is pivoted, through a link 49, to a lever 50 fulcrumed at 51. The lever 50 cooperates through a pin-and-slot connection with a lever 52 pivotally mounted on a shaft 112 and carrying a key 53. As will be seen later, the key 53 is the alignment key upon depression of which the alignment mechanism is brought into operation.

A latch 54 pivoted on the lever 52 is urged counterclockwise by a spring 55. Normally the latch 54 is arrested by a lug 58 of a detent 59 pivoted on a lever 60. The latch 54 is formed with an abutment 57 capable of engaging the lug 58 upon lifting the latch 54. The detent 59 is urged counterclockwise by a spring 62 anchored to the lever 60 which in turn is urged clockwise by a spring 63 about a pivot 64. Normally the detent 59 is arrested by a fixed stop 61. The lower arm of the lever 60 carries a stud 65 cooperating with an arm 66 of the bail 9.

The lever 52 carries a stud 67 cooperating with an inclined slot 113 of a bar 68. This bar is the usual motor bar, which, upon being shifted forward (to the right as seen in Fig. 1), clutches the main shaft 47 to the usual motor for one machine cycle. The mechanism controlled by the motor bar 68 is well known in the art and will not be described.

An arm 69 of the lever 52 is connected to a link 70 which is linked through a pin-and-slot connection to a lever 71 pivoted at 72. A bar 73 is linked to the lever 71, this bar being the usual sub-total bar of the machine. As is known in the art, each time a sub-total key is depressed, the sub-total bar 73 is shifted backwards for conditioning the machine for a sub-total operation. During said operation the amount accumulated in the register is transferred to the actuators and then reentered into the register. It will thus be apparent that the actuators may transitorily assume a position representative of the amount accumulated in the register.

A lever 74 pivoted at 75 is urged clockwise by a spring 114 (Fig. 2). The lever 74 carries a stud 77 which is normally arrested by the plate 17. In the normal position shown in Fig. 2 the forward end of the lever 74 arrests the lower arm of a lever 76 pivoted at 115 (Fig. 1) and urged clockwise by a spring 116. Pivoted to the lever 76 is a bar 117 mounted by means of a slot on a fixed stud 118 and provided with a projection 119 capable of engaging a pin 120 secured to the motor bar 68.

The numeral 80 designates a shaft which is rocked clockwise at the beginning of each machine cycle by the main shaft 47 and is then returned to normal. The means operated by the main shaft 47 for rocking the shaft 80 are known per se and will not be described. The shaft 80 carries an arm 79 having a stud 78 secured thereto.

The mode of operation of the mechanism will now be described.

Upon depression of the key 53, the motor bar 68 is shifted forwards, whereby a machine cycle is started. This cycle will be a sub-total cycle since through arm 69, link 70 and lever 71 the sub-total bar 73 has been shifted backwards concurrently with the forward movement of the motor bar 68. Furthermore, the lever 50 is rocked counterclockwise, whereby through the link 49 the bar 41 is swung clockwise and its appendix 48 is put in a position to face the stud 36.

As has been recalled above, at the beginning of a total or sub-total cycle the actuators 12 engage the register 101. Thereupon the universal bar 103 is lifted and the actuators 12 move into a position which is representative of the amount contained in the register, the actuators engaging the register orders which are different from zero moving upwards, while the other actuators remain in the normal position of Fig. 1. The operation of the universal bar 103 is so timed with respect to the cycling of the main shaft 47 that as soon as the universal bar starts its upward movement, the cam 46 rocks the lever 42 clockwise and the bar 41 is shifted backwards. The appendix 48 engages the stud 36 and swings the lever 32 counterclockwise. The stud 30 of the pawl 31, which engages a notch 29 of the rack 28, moves the latter forwards together with the plate 17.

As long as the sensing edges 106 of the lugs 19, beginning from the lug 19 of the highest order, contact a lug 15 of the actuators 12 of the higher orders standing at zero, one actuator arresting one lug 19 at a time as shown in Fig. 1, the plate 17 continues its forward movement. This is the case of an amount which is one or more orders smaller than the highest capacity of the register. When a lug 19 comes below the actuator 12 of the highest significant order of said amount, it is no more prevented by the lug 15 from rising and the plate 17 is rocked counterclockwise by the spring 27. Thus the lug 19 of the next higher order enters the aperture 16 of the corresponding actuator 12 and its arresting face 107 is arrested by the apex 105. The plate 17 is now locked against further forward movement and the stud 30 jumps over the remaining teeth of the rack 28, enabling the lever 32 to complete its oscillation. At the end of the machine cycle the bar 41 is returned to normal, as explained later, but the lever 32 is held in its counterclockwise rocked position by the positioning lever 37, while the plate 17 is held in its forward position by the stud 30. As will be disclosed later, the plate 17 will thus stop with the stop edge 108 of one of its lugs 19 the extension 4 of the pin carriage 100 in a position in which the pin carriage is aligned with the amount accumulated in the register.

Returning now to the key 53, it will be apparent from Fig. 1 that upon its depression the abutment 57 of the latch 54 will be lifted, thus latching the lug 58 of the detent 59. At the end of the sub-total cycle described above, the key 53 is returned to normal by a spring 121, as is known per se. The latch 54 lowers therefore the detent 59 and disengages it from the fixed stop 61. The lever 60 is permitted to be swung clockwise by its spring 63 and the stud 65 engaging the arm 66 rocks the bail 9 counterclockwise. The spacing dog 8 releases the spacing pin 3 and the pin carriage 100 is thus free to be moved toward the higher orders by its spring 14. As will be apparent from Fig. 3, the pin carriage 100 moves until arrested by a lug 19 which stops the extension 4. The latter is so arranged to insure the proper alignment between the first vertical row of stop pins 2 and the actuator 12 corresponding to the highest significant order of the amount accumulated in the register.

Fig. 3 schematically shows the actuators of the orders above the highest significant order of the amount accumulated in the register; by counting the residual lugs 19 it will be seen that the highest significant order of the amount is the fifth, which is aligned with the stop pin 2 of the highest order. It is to be remarked that the extension 4 engages the stop edge 108 of a lug 19 which is three lugs distant from the lug 19 sensing the highest significant order. This relation of the lug 19 stopping the extension 4 to the lug 19 sensing the highest significant order may be chosen at will when designing the machine, but it remains a fixed one during operation.

The numerals 81 and 82 designate two fixed stops, which correspond to a fictitious actuator 12 which is always staying at zero. As shown in Fig. 2, the plate 17 is normally prevented by said stops from rocking upwards.

It will be remarked that the aligning movement of the pin carriage 100 occurs after the end of the cycle, when the machine stands still. At the end of said movement another machine cycle may be automatically started to perform the operation for which the pin carriage has been aligned with the amount contained in the register. To this end the extension 4 upon contacting the lug 19 shifts the plate 17 from the position of Fig. 2 into the position of Fig. 3, the spring 14 overwhelming the combined actions of the springs 26 and 114. The plate 17 acts thereupon on the stud 77 and swings the lever 74 counterclockwise, thus releasing the lever 76. Under the urge of the spring 116 the lever 76 rocks clockwise (Fig. 1) and the extension 119 of the bar 117 engages the pin 120 of the motor bar 68, thus starting a new machine cycle.

During the forward stroke of this new machine cycle the stud 78 moves backwards and restores the lever 60 into the normal position of Fig. 1, in which the detent 59 reengages the stop 61. During said cycle the bar 41 moves backwards as described above and with its appendix 48 engages the stud 35. The lever 32 is rocked clockwise and the plate 17 is thus restored to normal.

It has been assumed above that the sub-total operation is performed in one machine cycle. However, there are many machines wherein a sub-total as well as a total operation requires two or even more machine cycles. In this case a certain machine cycle of the sequence of cycles is allotted to the up and down movement of the actuators. Therefore, it will be very simple to arrange the plate 17 to move forward during that cycle only. In the most usual case of a sequence of two cycles, this cycle will be the second cycle.

It has been further assumed that the key 53 is an additional key exclusively allotted to the aligning mechanism. In the case the aligning mechanism is to be used for aligning the divisor with the dividend, the key 53 may be dispensed with and the lever 52 may be controlled by the usual division key. To this end the lever 52 will be operated after having entered the dividend into the register and the divisor into the pin carriage. Upon operation of the lever 52, the pin carriage aligns with the dividend, whereupon the lever 76, which will control the mechanism previously controlled by the division key, will start the first division machine cycle.

Similarly, if the aligning mechanism will be used for aligning the pin carriage with a total which is to be reset in the pin carriage, the key 53 may be dispensed with and the lever 52 may be controlled by the usual reset key. In this case the bar 117 may be extended forwardly so as to be capable of engaging with its forward end a pin 122 secured to the lever 71. Thus the lever 76 will actuate the motor bar 68 as described above and furthermore it will shift the sub-total bar 73 backwards, whereby the ensuing machine cycle will be a sub-total cycle, during which the total is reset into the pin carriage, aligned therewith.

It has been furthermore assumed that the bar 73 is the sub-total bar. However, the bar 73 may be the total bar as well and an additional control, known per se, may be provided for preselecting the kind of total to be taken.

Instead of aligning the pin carriage with an amount stored in the register, it may be useful to align it with an amount contained in any other storage means. To this end the actuators 12 may be controlled by an additional storage means, or, as an alternative, the plate 17 may cooperate with any suitable amount representing means. In this connection it may be remarked that the plate 17 does not sense the actual position of the actuators 12, but distinguishes only between a zero position and an out of zero position of each actuator.

In the preferred embodiment of the invention disclosed above, the plate 17 moves longitudinally for sensing the actuators. However, it will be evident to those skilled in the art that the novel sensing means of the invention may with equal facility be arranged to move transversely, from the higher orders towards the lower orders. Either the register wheels or any means connected therewith, as the actuators, may be sensed. In the latter case each actuator may be formed with an aperture which when at zero lies in the path of the sensing means, thus permitting the movement of the latter. The first actuator which is out of zero position, this actuator being that of the highest significant order of the represented amount, obstructs the movement of the sensing means. The position thus assumed by the sensing means is representative of the number of digits of the amount, whereby the sensing means may be used as before for differentially arresting the traveling means.

Some adding machines have a stationary pin basket and an indexing mechanism movable step by stem over the pin basket for setting any selected pin. The aligning mechanism of the invention may be applied also to this type of machines. Since the indexing mechanism moves from the highest order towards the lower orders, the indexing mechanism should be arrested by the sensing means through a suitable reversing means in the case of the sensing means moving longitudinally to sense the actuators.

Inasmuch as the set of actuators 12 may be considered as a stationary amount representing device as well as the register, since similarly to each register pinion 104 each actuator 12 is movable from a zero position to a position representing a significant digit, the term "stationary amount representing device" as used in the present specification and claims is intended to be indifferently applicable to either device.

From the foregoing description it will also be understood that many changes may be made in the above construction, and different embodiments of the invention could be made without departing from the scope thereof. It is, therefore, intended that all matter contained in the above description, or shown in the accompanying drawing, shall be interpreted as illustrative, and not in a limiting sense.

What I claim is:

1. In a computing machine having an amount set-up means, a stationary amount representing device adapted to cooperate with said set-up means and including a set of differential elements movable from a zero position to a number of nonzero positions, traveling means for shifting the cooperative relationship of said amount set-up means and said set, a sensing device bodily movable with respect of said set for sequentially sensing the positions of said elements from the highest order toward the lower orders to detect upon a differential extent of said bodily movement the element of the highest significant order, and stop means differentially settable by said sensing device according to said extent for arresting the travel of said traveling means in predetermined constant relation to said highest significant order to align an invariable order of said amount set-up means with said highest significant order.

2. In a computing machine having an amount set-up means, a stationary amount representing device adapted to cooperate with said set-up means and including a set of differential elements movable from a zero position to a number of nonzero positions, spring actuated traveling means for shifting the cooperative relationship of said amount set-up means and said set, a sensing device bodily movable with respect of said set for sequently sensing the positions of said elements from the highest order toward the lower orders to detect upon a differential extent of said bodily movement the element of the highest significant order, stop means differentially settable by said sensing device into the path of said traveling means to arrest the travel thereof in predetermined relation to said highest significant order, means for starting a machine cycle, and means operable by said arresting means upon arresting said travel for actuating said starting means.

3. In a computing machine having an amount set-up means, a stationary amount representing device adapted to cooperate with said set-up means and including a set of differential elements movable from a zero position to a number of nonzero positions, traveling means for shifting the cooperative relationship of said amount set-up means and said set, a sensing device bodily movable with respect of said set for sequentially sensing the positions of said elements from the highest order toward the lower orders to detect upon a differential extent of said bodily movement the element of the highest significant order, normally ineffective stop means differentially settable by said sensing device according to said extent and movable into effective position for arresting the travel of said traveling means in predetermined relation to said highest significant order, and means controlled by the differential element of said highest significant order for so moving the set stop means.

4. In a computing machine having an amount set-up means, a stationary amount representing device adapted to cooperate with said set-up means and including a set of differential elements movable from a zero position to a number of nonzero positions, traveling means for shifting the cooperative relationship of said amount set-up means and said set, a sensing device bodily movable with respect of said set for sequentially sensing the positions of said elements from the highest order toward the lower orders to detect upon a differential extent of said bodily movement the element of the highest significant order, stop means differentially settable by said sensing device according to said extent for arresting the travel of said traveling means in predetermined relation to said highest significant order, a cyclically operating mechanism, and means controlled by said operating mechanism for moving said sensing device during one cycle of operation.

5. In a computing machine having an amount set-up means, a stationary amount representing device adapted to cooperate with said set-up means and including a set of differential elements movable from a zero position to a number of nonzero positions, spring actuated traveling means for shifting the cooperative relationship of said amount set-up means and said set, a sensing device bodily movable with respect of said set for sequentially sensing the positions of said elements from the highest order toward the lower orders to detect upon a differential extent of said bodily movement the element of the highest significant order, stop means differentially settable by said sensing device according to said extent for arresting the travel of said traveling means in predetermined relation to said highest significant order, a cyclically operating mechanism, means controlled by said operating mechanism for moving said sensing device during a cycle of operation, means for normally restraining said traveling means, and further means controlled by said operating mechanism substantially upon completion of said cycle for disabling said restraining means.

6. In a computing machine having an amount set-up means, a stationary amount representing device adapted to cooperate with said set-up means and including a set of differential elements movable from a zero position to a number of nonzero positions, traveling means for shifting the cooperative relationship of said amount set-up means and said set, a sensing device bodily movable with respect of said set for sequentially sensing the positions of said elements from the highest order toward the lower orders to detect upon a differential extent of said bodily movement the element of the highest significant order, stop means differentially settable by said sensing device according to said extent for arresting the travel of said traveling means in predetermined relation to said highest significant order, a main operating mechanism, means for starting said operating mechanism, means controlled by said operating mechanism for moving said sensing device during a cycle of operation, means for normally restraining said traveling means, and a program control device, said control device comprising a manual means, means controlled by said manual means for operating said starting means, further means controlled by said operating mechanism substantially upon completion of said cycle for disabling said restraining means, and means operable by said stop means upon arresting said traveling means for operating said starting means.

7. In a computing machine having an amount set-up means, a stationary amount representing device adapted to cooperate with said set-up means and including a set of differential elements movable from a zero position to a number of nonzero positions, spring actuated traveling means for shifting the cooperative relationship of said amount set-up means and said set, a sensing device bodily movable with respect of said set for sequentially sensing the positions of said elements from the highest order toward the lower orders to detect upon a differential extent of said bodily movement the element of the highest significant order, and a set of stop means movable with said sensing device and selectively settable according to said extent into the path of said traveling means to arrest the travel thereof in predetermined relation to said highest significant order, the stop means of said set, when so set, being located from the highest to the lowest order at decreasing distances from said traveling means, said travel decreasing with the increase of said extent.

8. In a computing machine having an amount set-up means, a stationary amount representing device adapted to cooperate with said set-up means and including a set of differential elements movable from a zero position to a number of nonzero positions, traveling means for shifting the cooperative relationship of said amount set-up means and said set, a halting device operable for differentially halting the progress of said traveling means, said halting device including a sensing element and an arresting element in each denominational order, said halting device being bodily movable with respect of said set to permit said sensing elements to sequentially sense the positions of said differential elements from the highest order toward the lower orders, the sensing element of the highest significant order of the amount represented in said set acting in response to the position of the differential element of such order to cause one of said arresting elements to arrest said halting device after a differential extent of said bodily movement, said halting device further including a stop having a fixed relation to each one of said sensing elements, the stop corresponding to said sensing element of the highest significant order halting said traveling means in predetermined constant relation to said order to align an invariable order of said amount set-up means with said highest significant order.

9. In a computing machine as claimed in claim 8, a main operating mechanism, means cyclically operated by said main operating mechanism for moving said halting device in relation to said set, and a yielding connection interposed between said moving means and said halting device to permit said moving means to complete its cycle notwithstanding said halting device is differentially arrested by said arresting elements.

10. In a computing machine having an amount set-up means, a stationary amount representing device adapted to cooperate with said set-up means and including a set of differential elements movable from a zero position to a number of nonzero positions, traveling means for shifting the cooperative relationship of said amount set-up means and said set, a halting device operable for differentially halting the progress of said traveling means, said halting device including a sensing element and a stop associated therewith in each denominational order, said halting device being bodily movable with respect of said set to permit said sensing elements to sequentially sense the positions of said differential elements from the highest order towards the lower orders, the sensing element of the highest significant order of the amount represented in said set acting in response to the position of the differential element of such order to select the associated stop for arresting said traveling means in predetermined relation to said order, each one of said stops being located at a constant distance from the associated sensing element.

11. A computing machine as claimed in claim 10, wherein said halting device is movable in a substantially rectilinear direction toward said set of differential elements.

12. In a computing machine having an amount set-up means, a stationary amount representing device adapted to cooperate with said set-up means and including a set of differential elements movable from a zero position to a number of nonzero positions, traveling means for shifting the cooperative relationship of said amount set-up means and said set, a halting device operable for differentially halting the progress of said traveling means, said halting device including a plate having a set of step-wise arranged projections, each projection including a sensing portion, an arresting portion and a stop portion, said plate being movable in a direction toward said set to permit said sensing portions to sequentially sense the positions of said differential elements from the highest order toward the lower orders, said plate also being mounted for limited motion in another direction, the sensing portion of the projection of the highest significant order of the amount represented in said set acting in response to the position of the differential element of such order to permit such movement of said plate in said other direction and to cause the arresting portion of a second projection of a higher order to arrest said plate, the stop portion of a third projection of a still higher order halting said traveling means in predetermined relation to said order.

13. A computing machine as claimed in claim 12, wherein each differential element is provided with a first member movable therewith and adapted to be sensed by the sensing portion of the corresponding projection and is further provided with a second member adapted to arrest the arresting portion of the corresponding projection.

14. In a computing machine having an amount set-up means, a register, a set of actuators to enter amounts from said set-up means into said register, each actuator being movable from a zero position to a number of nonzero positions, traveling means for shifting the co-operative relationship of said amount set-up means and said set, manual means for initiating an operation comprising a machine cycle wherein the amount stored in the register is transferred to said actuators, a sensing device bodily movable with respect of said set for sequentially sensing the positions of said actuators from the highest order toward the lower orders to detect upon a differential extent of said movement the actuator of the highest significant order, stop means differentially settable by said sensing device according to said extent for arresting the travel of said traveling means in predetermined relation to said highest significant order, and means controlled by said manual means for conditioning said sensing device to operate during said cycle.

15. In a computing machine, the combination comprising a traveling amount representing device, a set of amount representing elements arranged in denominational orders, each of said elements being movable from a zero position to a position representing a significant digit, a halting device operable for differentially halting the progress of said traveling device, said halting device including a sensing element and an arresting element in each denominational order, said halting device being movable in a direction toward said set to permit said sensing elements to sequentially sense the positions of said representing elements from the highest to the lowest order, said halting device also being mounted for limited motion in another direction, the sensing element of the highest significant order of the amount represented in said set acting in response to the position of the representing element of such order to permit such movement of said device in said other direction and to cause one of said arresting elements to arrest said halting device, said halting device further including a stop having a fixed relation to each of said sensing elements, the stop corresponding to said sensing element of the highest significant order halting said traveling device in predetermined relation to said order.

16. In a computing machine, the combination comprising a traveling amount representing device, a set of amount representing elements arranged in denominational orders, each of said elements being movable from a zero position to a position representing a significant digit, a halting device operable for differentially halting the progress of said traveling device, said halting device including a sensing element and an arresting element in each denominational order, said halting device being movable in a direction toward said set to permit said sensing elements to sequentially sense the positions of said representing elements from the highest to the lowest order, said halting device also being mounted for limited motion in another direction, the sensing element of the highest significant order of the amount represented in said set acting in response to the position of the representing element of such order to permit such movement of said device in said other direction and to cause one of said arresting elements to arrest said halting device, said halting device being furthermore mounted for limited motion in a third direction, said halting device further including a stop having a fixed relation to each of said sensing elements, the stop corresponding to said sensing element of the highest significant order being engageable by said traveling device to halt the traveling device in predetermined relation to said order upon completion of the limited motion of the halting device in said third direction, means for starting a machine cycle, and means operable by said halting device upon completion of said last-named motion for actuating said starting means.

17. In a computing machine, the combination of a transversely movable indexing mechanism, a set of differential members transversely arranged in denominational orders and associated with said indexing mechanism, each of said differential members being movable in a longitudinal plane from a zero position to a position representing a significant digit, a plate including a set of transversely step wise arranged projections each one comprising a sensing portion, an arresting portion and a stop, said plate being longitudinally movable toward said set of differential members to permit the sensing portion of said projections to sequentially sense the positions of said differential members from the highest to the lowest order, said plate being furthermore rockable about a transverse axis, the projection sensing the differential member of the highest significant order acting in response to the position of said differential member to permit said plate to rock about said axis and to cause the arresting portion of the projection of the next higher order to arrest said plate against the corresponding differential member, whereby one of said stops having a fixed relation to the projection sensing the differential member of the highest significant order is conditioned to stop said indexing mechanism in predetermined relation to said order.

18. In a computing machine, the combination of a transversely movable indexing mechanism, a set of differential members transversely arranged in denominational orders and associated with said indexing mechanism, each of said differential members being movable in a longitudinal plane from a zero position to a position representing a significant digit, a plate including a set of transversely stepwise arranged projections each one comprising a sensing portion, an arresting portion and a stop, said plate being longitudinally movable toward said set of differential members to permit the sensing portion of said projections to sequentially sense the positions of said differential members from the highest to the lowest order, said plate being furthermore rockable about a transverse axis, the projection sensing the differential member of the highest significant order acting in response to the position of said differential member to permit said plate to rock about said axis and to cause the arresting portion of the projection of the next higher order to arrest said plate against the corresponding differential member, said plate being furthermore slidable in a transverse direction, one of said stops having a fixed relation to the projection sensing the differential member of the highest significant order being engageable by said indexing mechanism to stop the indexing mechanism in predetermined relation to said order upon completion of the transverse motion of said plate, a motor bar, and actuating means operable by said plate upon completion of said transverse motion for actuating said motor bar.

19. In a computing machine as claimed in claim 18, a main operating mechanism, means cyclically operated by said main operating mechanism for longitudinally moving said plate toward said set of differential members, and a yielding connection interposed between said moving means and said plate to permit said moving means to complete its cycle notwithstanding said plate is arrested against said corresponding differential member.

References Cited in the file of this patent

UNITED STATES PATENTS

| | | |
|---|---|---|
| 1,915,037 | Suter | June 20, 1933 |
| 1,966,584 | Gardner | July 17, 1934 |
| 2,365,507 | Allen | Dec. 19, 1944 |
| 2,515,692 | Boyden et al. | July 18, 1950 |
| 2,653,765 | Machado et al. | Sept. 29, 1953 |